(12) United States Patent
Kawamoto

(10) Patent No.: US 7,854,557 B2
(45) Date of Patent: Dec. 21, 2010

(54) VANE DRIVING DEVICE

(75) Inventor: Hisashi Kawamoto, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 12/570,593

(22) Filed: Sep. 30, 2009

(65) Prior Publication Data

US 2010/0019585 A1 Jan. 28, 2010

Related U.S. Application Data

(63) Continuation of application No. PCT/JP2008/69098, filed on Oct. 22, 2008.

(30) Foreign Application Priority Data

Nov. 30, 2007 (JP) ............................. 2007-311299

(51) Int. Cl.
- G03B 9/06 (2006.01)
- G03B 9/02 (2006.01)
- H02K 7/06 (2006.01)

(52) U.S. Cl. ..................... 396/510; 396/501; 396/508; 396/496; 396/497; 310/37

(58) Field of Classification Search ................... 310/37; 396/510, 463, 493, 497, 500, 501, 508
See application file for complete search history.

(56) References Cited

U.S. PATENT DOCUMENTS 5,705,873 A * 1/1998 Sato ........................... 310/193

5,926,663 A * 7/1999 Suzuki ......................... 396/449

FOREIGN PATENT DOCUMENTS

| JP | 3-231722 | 10/1991 |
|---|---|---|
| JP | 2000-231049 | 8/2000 |
| JP | 2005-173355 A1 | 6/2005 |
| JP | 2005-309443 A1 | 11/2005 |
| JP | 2007-183372 A1 | 7/2007 |
| JP | 2007-192860 A1 | 8/2007 |

OTHER PUBLICATIONS

International Search Report for International Application No. PCT/JP2008/069098 dated Nov. 25, 2008.

* cited by examiner

*Primary Examiner*—Quyen Leung
*Assistant Examiner*—Leda Pham
(74) *Attorney, Agent, or Firm*—Kratz, Quintos & Hanson, LLP

(57) ABSTRACT

A vane driving device includes: two boards each having an opening and defining a blade chamber therebetween; a blade changing an area of the opening and housed in the blade chamber; a drive source for driving the blade, the drive source including: a coil winded around a stator and exciting a stator; a rotor rotatably supported by a rotary shaft, rotatable in conjunction with the rotary shaft, and magnetized to have different polarities in a circumferential direction; and a rotor pinion meshing a driven member, and integrally formed in the rotary shaft; and a printed substrate electrically connected to the coil. The two boards define a drive source chamber housing the drive source therebetween. At least one of the two boards has an opening for escaping the coil outwardly from the drive source chamber. The printed substrate is arranged on a outer wall surface opposite to the drive source chamber.

2 Claims, 15 Drawing Sheets

VANE DRIVING DEVICE

CROSS-REFERENCE TO RELATED APPLICATION

This application is a continuation of and claims priority to International Patent Application No. PCT/JP2008/069098 filed on Oct. 22, 2008, which claims priority to Japanese Patent Application No. 2007-311299 filed on Nov. 30, 2007, subject matter of these patent documents is incorporated by reference herein in its entirety.

BACKGROUND OF THE INVENTION

1. Field of the Invention

The present invention relates to vane driving devices.

2. Description of the Related Art

There is known a vane driving device, employed in a camera or the like, including two boards each having an opening and defining a blade chamber therebetween; a blade changing an area of the opening and housed in the blade chamber; and a drive source driving the blade.

Japanese Unexamined Patent Application Publication No. 2007-183372 discloses a device in which a shutter plate and a blade support plate are employed as two boards, the blade housed between the both. Further, an electromagnetic actuator is employed as the drive source. Two covers are attached to sandwich this electromagnetic actuator from its axial direction, and the electromagnetic actuator is produced to be a single unit as a single part with easy handling. This electromagnetic actuator is attached apart from the blade support plate and the blade in the optical axis direction. Such an electromagnetic actuator generally includes: a rotor; a stator; and a coil for excitation. A printed substrate, for ensuring the energization of the coil, is generally attached on the shutter plate or the like.

In such a vane driving device, two boards defining the blade chamber, and the electromagnetic actuator formed to be a single unit, are separately provided. This is a factor of increasing the thickness of the vane driving device in the optical axis direction.

Further, when the above actuator is employed as the drive source, the wire of the coil of the actuator has to be extended to the printed substrate. In order to extend the wire of the coil, a jumper line for reinforcing the wire has to be attached or the wire has to be fixed, thereby increasing the manufacturing cost.

SUMMARY OF THE INVENTION

It is therefore an object to provide a vane driving device which reduces its thickness in the optical axis direction and its manufacturing cost.

According to an aspect of the present invention, there is provided a vane driving device including: two boards each having an opening and defining a blade chamber therebetween; a blade changing an area of the opening and housed in the blade chamber; a drive source for driving the blade, the drive source including: a coil wound around a stator and exciting a stator; a rotor rotatably supported by a rotary shaft, rotatable in conjunction with the rotary shaft, and magnetized to have different polarities in a circumferential direction; and a rotor pinion meshing a driven member, and integrally formed in the rotary shaft; and a printed substrate electrically connected to the coil, wherein: the two boards define a drive source chamber housing the drive source therebetween; at least one of the two boards has an opening for escaping the coil outwardly from the drive source chamber; and the printed substrate is arranged on a outer wall surface opposite to the drive source chamber.

BRIEF DESCRIPTION OF THE DRAWINGS

Preferred embodiments of the present invention will be described in detail with reference to the following drawings, wherein.

DESCRIPTION OF THE PREFERRED EMBODIMENTS

Figure 1:
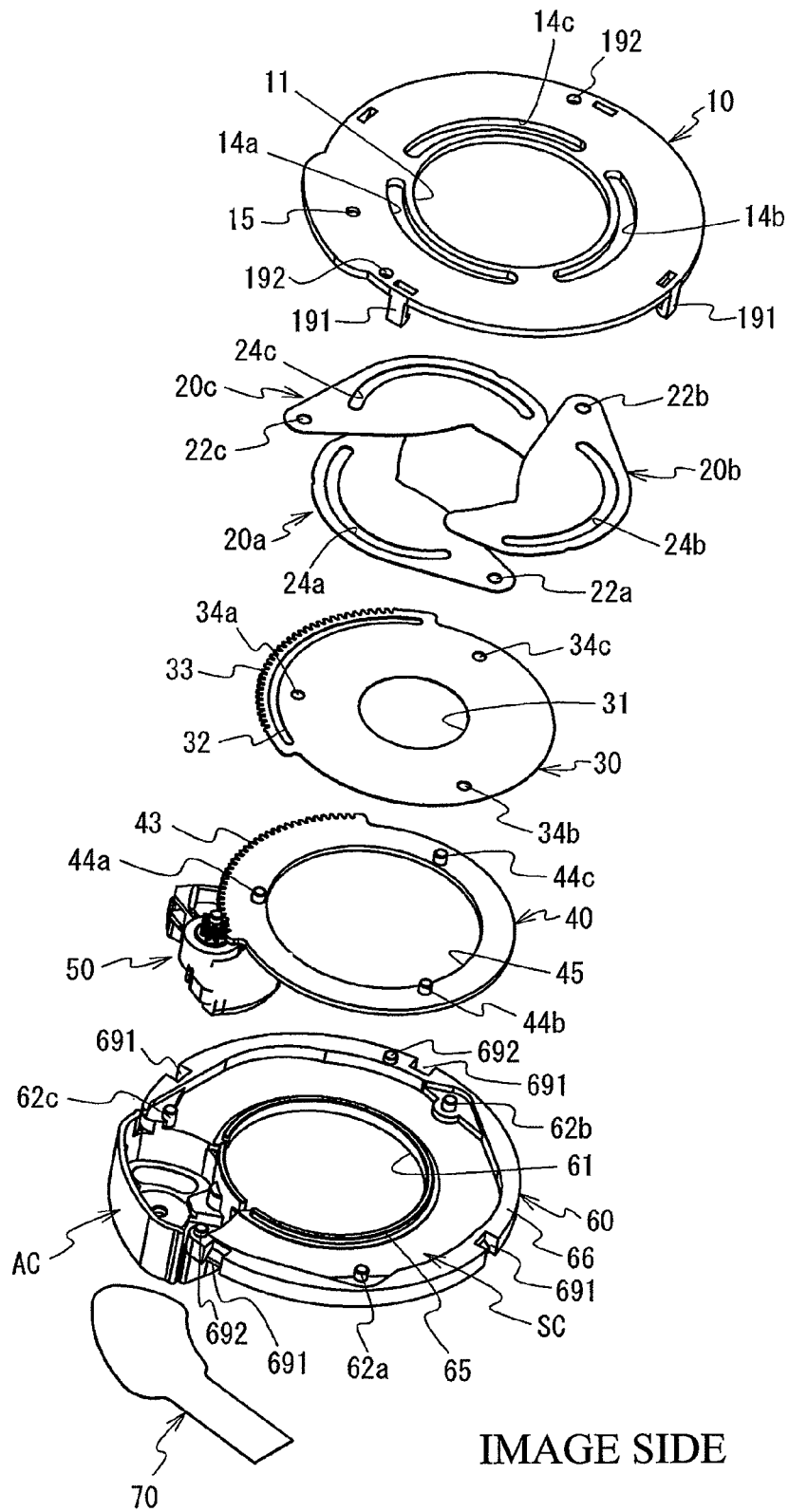
FIG. 1 is an exploded perspective view of the vane driving device according to the embodiment.

The following description will be given of an embodiment according to the present invention with reference to the drawings. FIG. 1 is an exploded perspective view of the vane driving device according to the embodiment. The vane driving device according to the embodiment includes: a blade support plate 10; blades 20a to 20c; an elastic gear 30 serving as a first gear; a drive ring 40 serving as a second gear; an electromagnetic actuator 50; a shutter plate 60; and a flexible printed circuit board 70, which are arranged in this order from the object side to the image side, when the object side is located to the upper side in FIG. 1 and the image side is located to the lower side in FIG. 1.

The blades 20a to 20c, the elastic gear 30, the drive ring 40, and the electromagnetic actuator 50 are housed between the blade support plate 10 and the shutter plate 60. The blade support plate 10 and the shutter plate 60 have openings 11 and 61, defining the optical path, at their center portions, respectively. The electromagnetic actuator 50 transmits its drive force to the blades 20a to 20c via the drive ring 40 and the elastic gear 30. The drive ring 40 has a ring shape. The drive ring 40 is partially provided with a teeth portion 43, serving as a second teeth portion to which the drive force is transmitted from the electromagnetic actuator 50, at its outer periphery.

The drive ring 40 is slidably supported relative to the shutter plate 60. Specifically, a sliding edge 45 slidably contacts an inner edge portion 65.

Further, the drive ring 40 has plural drive pins 44a to 44c along the sliding edge 45 at even intervals. The drive pins 44a to 44c respectively engage engagement holes 34a to 34c formed in the elastic gear 30. The elastic gear 30 is fixed on the drive ring 40 to overlap it in the rotational axis direction, that is, in the optical axis direction. Furthermore, the elastic gear 30 is provided with a teeth portion 33, serving as a first teeth portion, at its outer periphery so as to overlap the teeth portion 43 in the optical axis direction. Also, a circular arc slot 32, which serves as a deformation facilitating portion and has a hole shape, is provided between the teeth portion 33 and the rotational center of the teeth portion 33.

Specifically, the circular arc slot 32, which serves as a deformation facilitating portion and has a hole shape, extends along the teeth portion 33. The elastic gear 30 also has an opening 31 defining the optical path at its center portion. The elastic gear 30 is thinner than the drive ring 40. Therefore, the elastic gear 30 is more deformable than the drive ring 40. Moreover, the elastic gear 30 is made deformable in the radial direction by the circular arc slot 32. In addition, the diameter of the opening 31 is smaller than those of the openings 11 and 61.

The blades 20a to 20c are arranged at the object side relative to the elastic gear 30. The blades 20a to 20c are provided with shaft holes 22a to 22c at their end portions, respectively. The shaft holes 22a to 22c respectively engage support shafts 62a to 62c formed on the shutter plate 60. This allows the blades 20a to 20c to be swingably supported with respect to the shutter plate 60. Moreover, the blades 20a to 20c are respectively provided with cam slots 24a to 24c. The cam slots 24a to 24c respectively engage the drive pins 44a to 44c. Therefore, by rotating the drive ring 40, the drive pins 44a to 44c are respectively moved within the cam slots 24a to 24c, and the blades 20a to 20c are respectively swung about the shaft holes 22a to 22c. Accordingly, the opening areas of the openings 11, 31, and 61 are adjustable. Consequently, the drive ring 40 serves as a drive member for transmitting the drive force from the electromagnetic actuator 50 to the blades 20a to 20c.

Further, the blade support plate 10 is provided with escape holes 14a to 14c, for reliving the drive pins 44a to 44c, in the vicinity of the opening 11. Furthermore, the blade support plate 10 is provided with a shaft hole 15 supporting a rotary shaft 54 of the electromagnetic actuator 50, as will be described later in more detail. Engagement pawls 191, which are formed at an edge portion of the blade support plate 10, engage engagement portions 691, which are formed at an outer edge portion 66 of the shutter plate 60. Engagement holes 192, which are formed in the blade support plate 10, fit projective portions 692, which are formed at the outer edge portion 66 of the shutter plate 60. In this manner, the blade support plate 10 is attached to the shutter plate 60.

The flexible printed circuit board (hereinafter referred to as FPC) 70, serving as a printed substrate, has a flexibility, and is fixed to the shutter plate 60 at an outer side surface thereof defining an actuator chamber AC housing the electromagnetic actuator 50. The FPC 70 is electrically connected to the electromagnetic actuator 50 and ensures the supply of electric power for the electromagnetic actuator 50.

Figure 2:
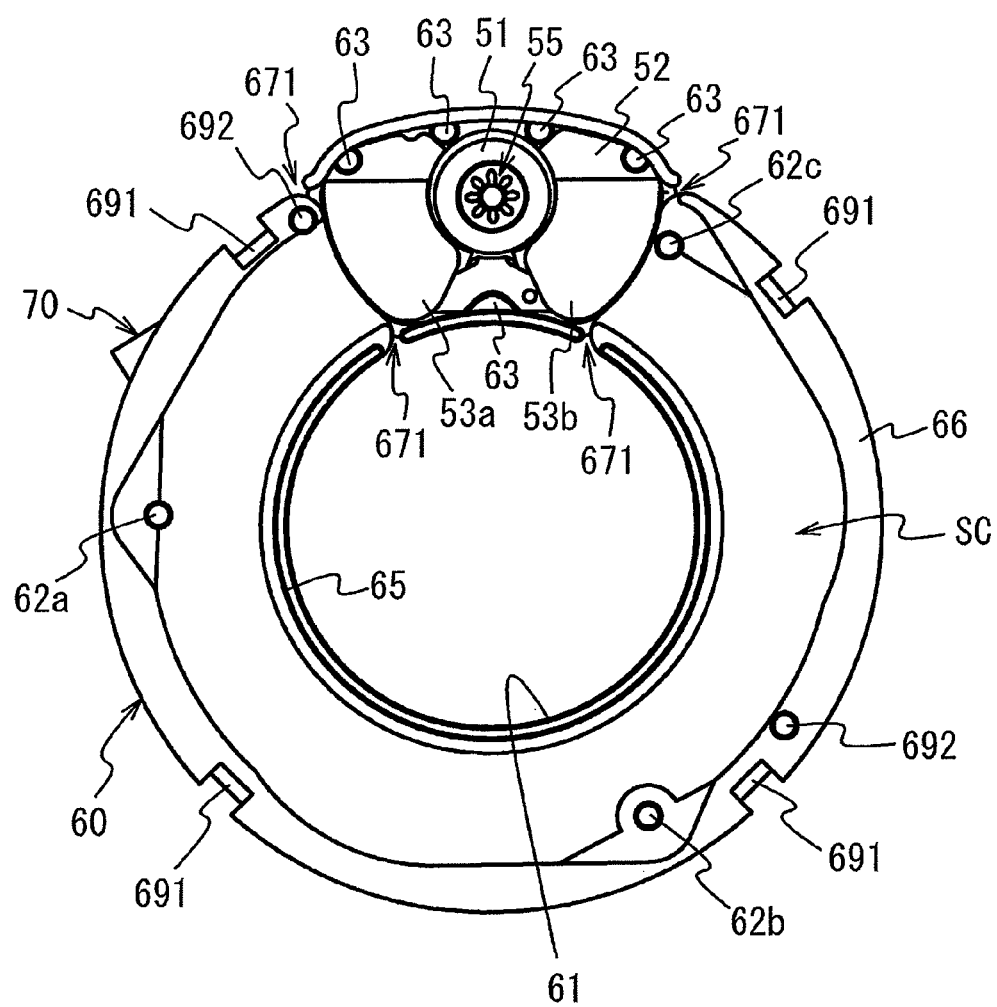
FIG. 2 is a front view of the vane driving device in which an electromagnetic actuator is assembled into a shutter plate.

FIG. 2 is a front view of the vane driving device in which the electromagnetic actuator 50 is assembled into the shutter plate 60. Referring to FIGS. 1 and 2, a blade chamber SC for housing the blades 20a to 20c and the actuator chamber AC for housing the electromagnetic actuator 50 are provided in the shutter plate 60. The actuator chamber AC projects to the image side in the optical axis direction relative to the blade chamber SC, and has a recess shape. The electromagnetic actuator 50 includes a rotor 51, a stator 52, coils 53a and 53b, and a rotor pinion 55, as illustrated in FIG. 2. The rotor 51 is magnetized to have different polarities in its circumferential direction. The rotary shaft 54 supports the rotor 51 and the rotor pinion 55 for integral rotation.

Moreover, as will be described later in more detail, the rotor pinion 55 is integrated with the rotary shaft 54 which is not indicated by the reference numeral in FIG. 2. Also, the rotary shaft 54, the rotor pinion 55 and the rotor 51 are formed by insert molding. Thus, the rotary shaft 54, the rotor pinion 55, and the rotor 51 are integrally formed. The stator 52 has a letter U shape and two arm portions, around which the coils 53a and 53b are respectively wound. The end portions of the coils 53a and 53b are electrically connected to the FPC 70. The stator 52 is excited by energization of the coils 53a and 53b, so that the magnetic force generated between the stator 52 and rotor 51 rotates the rotor 51 by a given range.

Further, the actuator chamber AC is provided with five boss portions 63 serving to align the electromagnetic actuator 50. Furthermore, four escape holes 671, which escape the end portions of the coils 53a and 53b outwardly from the actuator chamber AC, are provided in the vicinity of the actuator chamber AC. The two escape holes 671 are provided in the vicinity of the opening 61, and the remaining two escape holes 671 are provided at the outer periphery side. The end portions of the coils 53a and 53b are escaped outwardly through the escape holes 671, and are connected to solder land portions of the FPC 70 serving as a printed substrate, thereby attaining the electrical connection. These arrangements will be described later in more detail.

Figure 3:
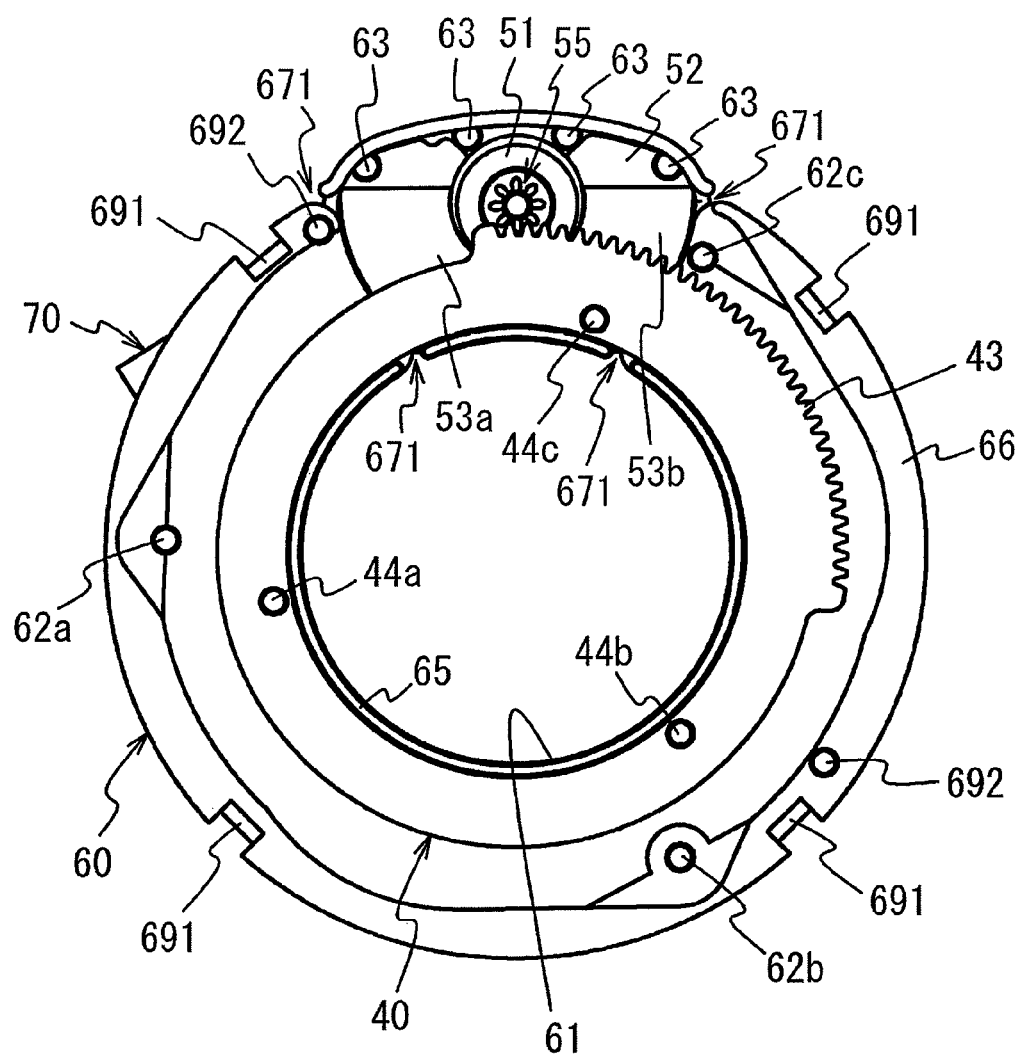
FIG. 3 is a front view of the vane driving device in which a drive ring is further assembled into the shutter plate.

FIG. 3 is a front view of the vane driving device in which the drive ring 40 is further assembled into the shutter plate 60. As illustrated in FIG. 3, the drive ring 40 serving as a driven member is assembled to mesh the teeth portion 43 with the rotor pinion 55.

Figure 4:
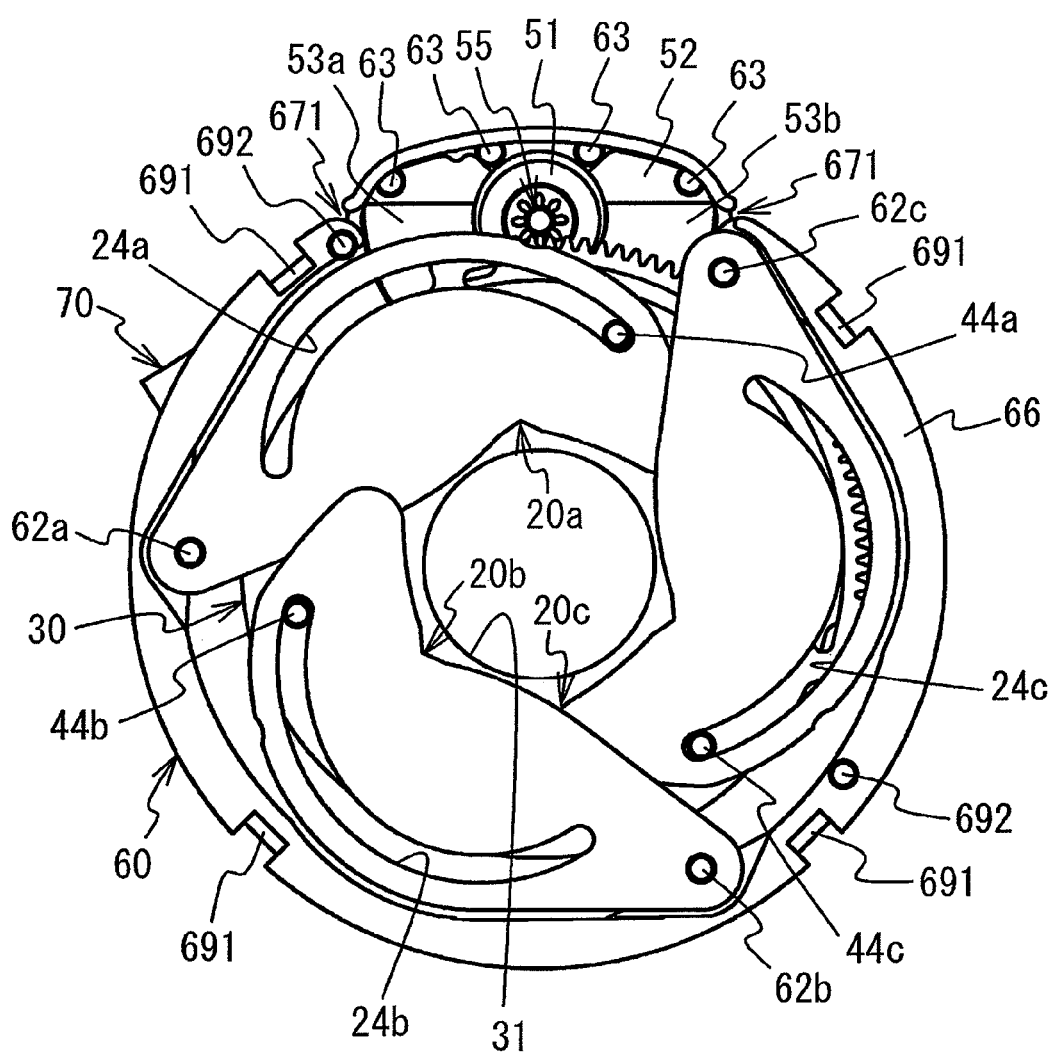
FIG. 4 is a front view of the vane driving device, in a fully opened state, in which an elastic gear, blades are further assembled into the shutter plate.
Figure 5:
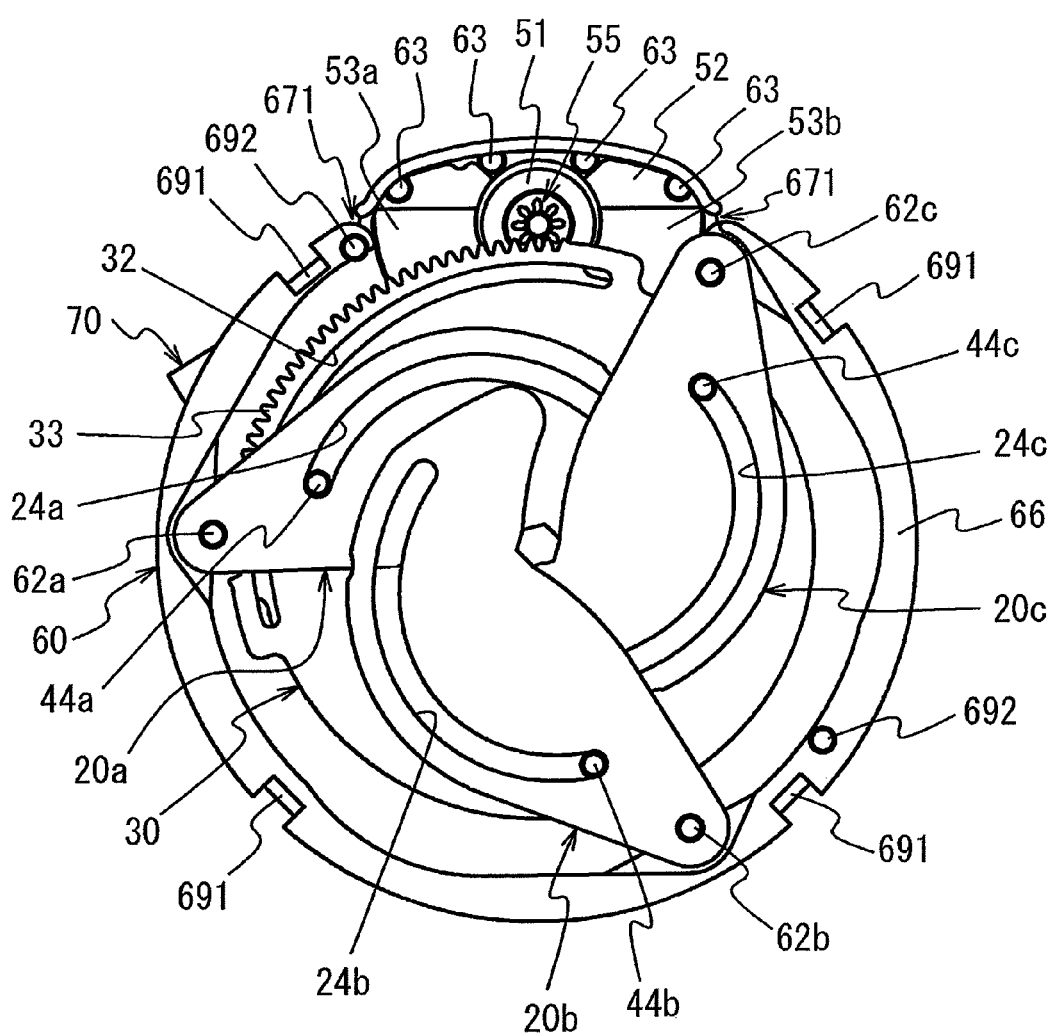
FIG. 5 is a front view of the vane driving device, in a small aperture state, in which the elastic gear, the blades are further assembled into the shutter plate.

FIG. 4 is a front view of the vane driving device, in a fully opened state, in which the elastic gear 30, the blades 20a to 20c are further assembled into the shutter plate 60. FIG. 5 is a front view of the vane driving device, in a small aperture state, in which the elastic gear 30, the blades 20a to 20c are further assembled into the shutter plate 60. Referring to FIG. 4, the vane driving device is brought into the fully opened state by positioning the blades 20a to 20c in receded positions receded from the openings 31 and 61. Also, referring to FIG. 5, the small aperture state, in which the opening amounts of the openings 31 and 61 are reduced, is defined by positioning the blades 20a to 20c to cover the openings 31 and 61.

When the rotor pinion 55 rotates clockwise from the state illustrated in FIG. 4, the drive ring 40 rotates counterclockwise, whereas the blades 20a to 20c swing clockwise, thereby shifting the state to the state illustrated in FIG. 5.

Figure 6:
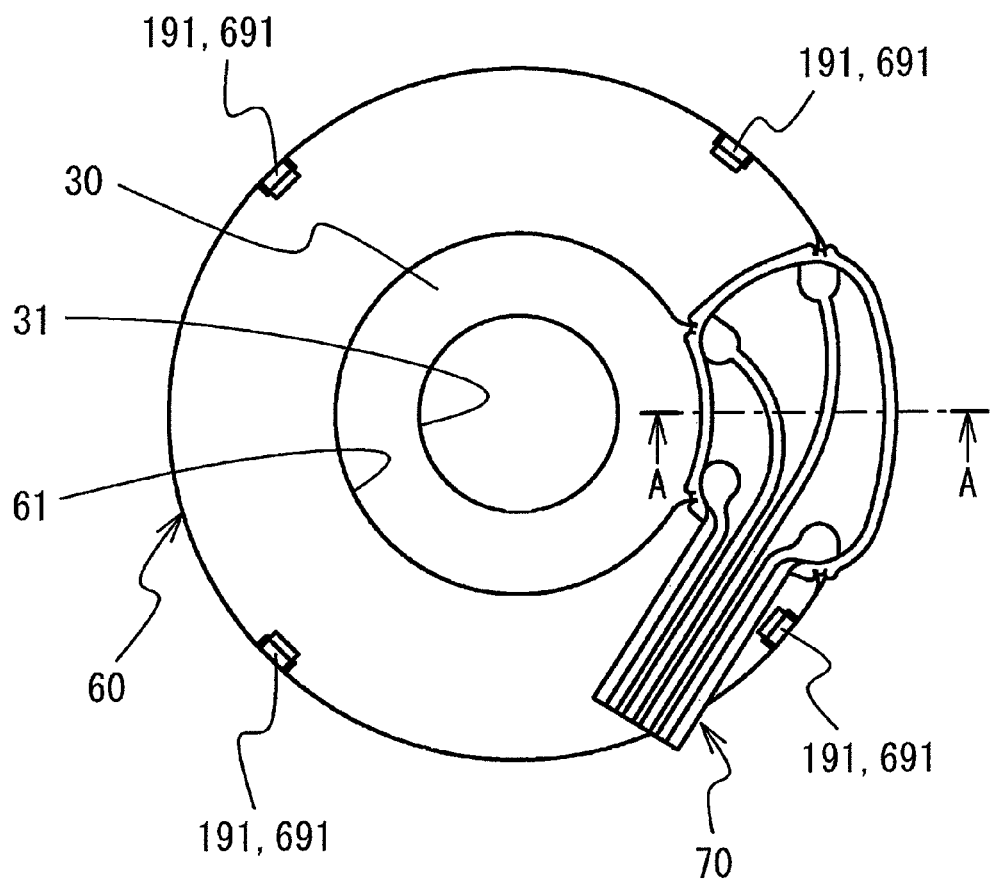
FIG. 6 is a rear view of the vane driving device.

FIG. 6 is a rear view of the vane driving device. The FPC 70 is fixed to the outer wall, defining the actuator chamber AC of the shutter plate 60, at the image side by use of a double-faced tape or the like.

Figure 7:
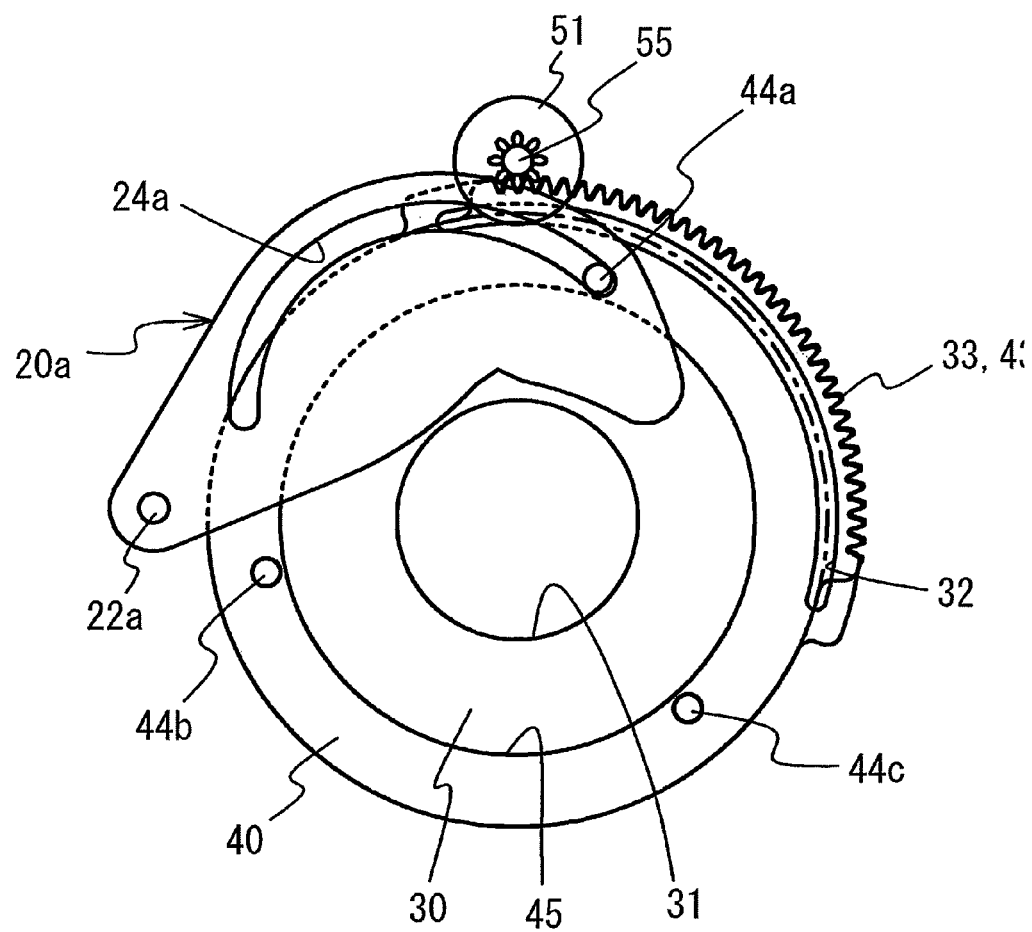
FIG. 7 is a view of a part of the vane driving device in the fully opened state.

FIG. 7 is a view of a part of the vane driving device in the fully opened state. FIG. 7 illustrates the elastic gear 30, the drive ring 40, the blade 20a, the rotor 51, and the rotor pinion 55, in order to facilitate the understanding of the embodiment. The elastic gear 30 is arranged at the object side relative to the drive ring 40. In the fully opened state, the outer edge of the blade 20a contacts the rotor pinion 55. This will be described later in more detail. Additionally, the elastic gear 30 and the drive ring 40 are fixed to each other such that the teeth portions 33 and 43 are slightly misaligned. Further, the elastic gear 30 is made thinner than the drive ring 40. Specifically, the thickness of the elastic gear 30 is reduced to about one-sixth of that of the drive ring 40. Further, the elastic gear 30 is made of a synthetic resin such as polyethylene terephthalate or acrylate resin, and is formed into a film shape. For this reason, the elastic gear 30 is made of a material which is more deformable that of than the drive ring 40 which is made of a general material such as polyacetal resin or nylon resin. As exemplified the material of the elastic gear 30 above, the material of the elastic gear 30 is not limited to the above one, and may be any one that is more deformable than the drive ring 40.

Figure 8A:
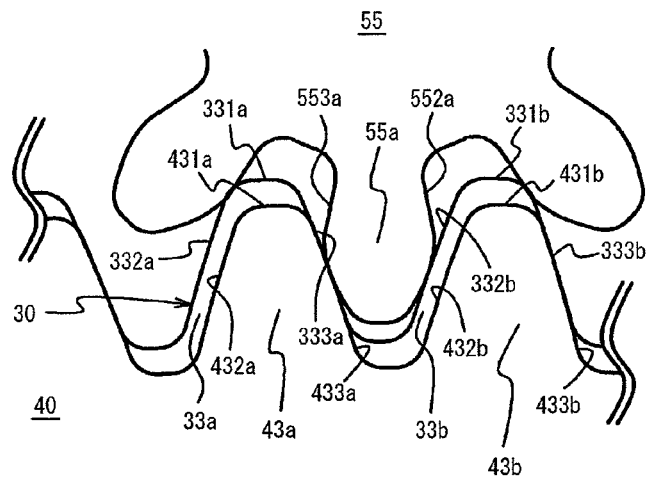
FIGS. 8A to 8C are explanatory views of the meshing of teeth portions and a rotor pinion.
Figure 8B:
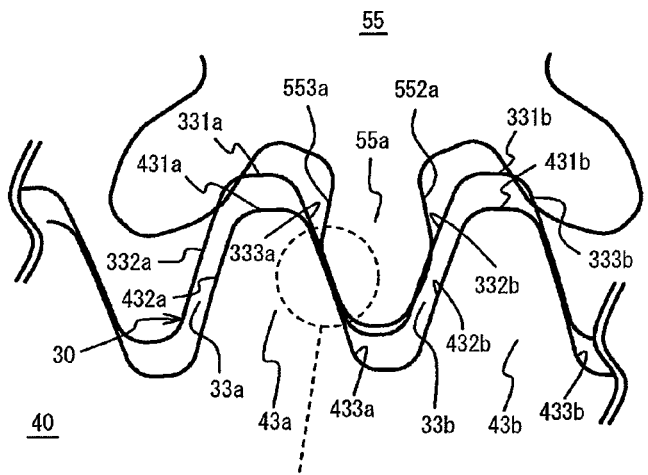
Figure 8C:
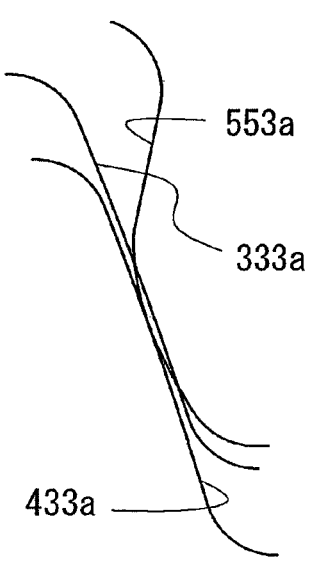

Next, a description will be given of meshing of the teeth portions 33 and 43 and the rotor pinion 55. FIGS. 8A to 8C are explanatory views of the meshing of the teeth portions 33 and 43 and the rotor pinion 55. FIG. 8A illustrates the state after the teeth portions 33 and 43 mesh the rotor pinion 55. FIG. 8B illustrates the state before the teeth portions 33 and 43 mesh the rotor pinion 55. FIG. 8C illustrates an enlarged part of FIG. 8B. Additionally, the rotor pinion 55 is also illustrated in FIGS. 8A to 8C, in order to facilitate the understanding of the embodiment.

Referring to FIG. 8A, the teeth portion 33 includes plural tooth portions 33a, 33b . . . , and the teeth portion 43 also includes plural tooth portions 43a, 43b . . . . As illustrated in FIG. 8A, a tooth tip 331a of the tooth portion 33a radially and outwardly projects from a tooth tip 431a of the tooth portion 43a. Further, one tooth surface 332a of the tooth portion 33a projects from one tooth surface 432a of the tooth portion 43a in the circumferential direction. Furthermore, the other tooth surface 333a of the tooth portion 33a substantially overlaps the other tooth surface 433a of the tooth portion 43a. This configuration also applies the tooth portions 33b and 43b adjacent to each other. In addition, the rotor pinion 55 includes plural tooth portions 55a . . . . One tooth surface 552a of the tooth portion 55a contacts the tooth surface 332b, and the other tooth surface 553a of the tooth portion 55a contacts both of the tooth surfaces 333a and 433a.

Further, the elastic gear 30 is provided with the circular arc slot 32 extending along the teeth portion 33 in the circumferential direction, as illustrated in FIG. 7. By providing the circular arc slot 32, the elastic gear 30 is elastically deformed, specifically, in the radial direction with ease. Thus, the circular arc slot 32 serves as a deformation facilitating portion for facilitating the elastic deformation of the elastic gear 30. Moreover, since the elastic gear 30 and the drive ring 40 are fixed to and overlapped with each other in the axial direction by fitting the drive pins 44a to 44c into the engagement holes 34a to 34c, respectively, the elastic gear 30 and the drive ring 40 serve as a pair of gears. Furthermore, the rotor pinion 55 serves as a mating gear meshing the pair of gears.

In this way, since the teeth portion 33 projects outwardly from the teeth portion 43, when the rotor pinion 55 meshes the teeth portions 33 and 43, the teeth portion 33 initially meshes the rotor pinion 55 in priority to the teeth portion 43. Moreover, since the teeth portion 33 is readily deformed in the radial direction at the circumferential range by providing the circular arc slot 32 in the elastic gear 30, the teeth portion 33 is allowed to mesh the rotor pinion 55, to be closer than to the teeth portion 43. This suppresses the backlash between the rotor pinion 55, and the elastic gear 30 and the drive ring 40 serving as a pair of gears. That is, the rotor pinion 55, and the elastic gear 30 and the drive ring 40 are always suppressed from rattling such that the axis of the rotor pinion 55 is spaced apart from those of the elastic gear 30 and the drive ring 40. This reduces the operation noise caused by the axial backlash generated between the rotary shaft 54 and the shaft hole 15 formed in the blade support plate 10, between the rotary shaft 54 and a shaft hole 64 formed in the shutter plate 60, or between the drive ring 40 and the inner edge portion 65 provided in the shutter plate 60.

Additionally, the projection amount of the tooth surface 332a from the tooth surface 432a in the circumferential direction is different from that of the tooth surface 333a from the tooth surface 433a. That is, the tooth surface 552a contacts the tooth surface 332b, whereas the tooth surface 553a contacts both of the tooth surfaces 333a and 433a. Unlike the elastic gear 30, the drive ring 40 does not employ a configuration for facilitating its elastic deformation. Thus, the amount of the elastic deformation of the elastic gear 30 is variable in response to the rotational direction of the rotor pinion 55. That is, when the rotor pinion 55 rotates counterclockwise, the tooth surface 332b serves as a transmitted surface to which the drive force is transmitted from the rotor pinion 55, whereas, when the rotor pinion 55 rotates clockwise, the tooth surfaces 333a and 433a serve as transmitted surfaces to which the drive force is transmitted from the rotor pinion 55. Accordingly, when the rotor pinion 55 rotates counterclockwise, since the tooth surface 332b is elastically deformed with ease, the tooth surfaces 552a and 332b constantly contact each other to transmit the drive force from the rotor pinion 55. This mainly suppresses the backlash caused between the rotor pinion 55 and the drive ring 40 in the normal line direction, and also reduces the operation noise caused by the backlash. Further, when the rotor pinion 55 rotates clockwise, the transmission accuracy of the rotational drive force is mainly improved by contacting the tooth surface 433a with the tooth surface 553a.

Further, when the rotor pinion 55 rotates clockwise, the blades 20a to 20c swing in such a direction to reduce the opening areas of the openings 11, 31, and 61. Thus, the drive force is transmitted from the rotor pinion 55 to the tooth surfaces 433a and 433b, in the process for reducing the opening areas. For this reason, the drive force is transmitted to the teeth portion 43 of the drive ring 40 which does not employ the configuration for facilitating the elastic deformation. Consequently, the accuracy of the aperture can be maintained.

Next, a description will be given of the state of the teeth portions 33 and 43 before meshing the rotor pinion 55. Referring to FIGS. 8B and 8C, the tooth surface 333a slightly projects outwardly from the tooth surface 433a in the circumferential direction. In the state before the mesh, the projection amount of the tooth surface 332a from the tooth surface 432a in the circumferential direction is also different from that of the tooth surface 333a from the tooth surface 433a. This configuration also applies the tooth surfaces 333b and 433b. In the design of the distance between the axis of the rotor pinion 55, and the axes of the elastic gear 30 and the drive ring 40, it is necessary to consider the projection amount of the tooth surface 333a from the tooth surface 433a. That is, it is necessary to design the distance between the axis of the rotor pinion 55, and the axes of the elastic gear 30 and the drive ring 40, such that the projection amount of the tooth surface 333a from the tooth surface 433a is made zero by a pressing force of the rotor pinion 55 pressed against the elastic gear 30, so that the tooth surfaces 433a and 333a are substantially overlapped with each other. This suppresses the backlash and improves the transmission accuracy of the rotational drive force.

Next, a description will be given of the elastic gear 30 in more detail. As illustrated in FIGS. 1 and 7, the circular arc slot 32 is arranged along the teeth portion 33 partially provided at the outer edge of the elastic gear 30, is arranged between the teeth portion 33 and its rotation center, and extends in the circumferential direction. With such a configuration, the elastic deformation of the elastic gear 30 in a radial direction can be facilitated in its circumferential range.

Further, the elastic gear 30 and the drive ring 40 are fixed to each other by respectively engaging the drive pins 44a to 44c with the engagement holes 34a to 34c. Therefore, the drive pins 44a to 44c and the engagement holes 34a to 34c serve as engagement means for fixing them by engaging. In this manner, the elastic gear 30 and the drive ring 40 can be fixed to each other by a simple structure, thereby improving the assembling workability.

Furthermore, the engagement holes 34a to 34c are arranged at the radially inner side from the circular arc slot 32. This reason is as follows. When the means for fixing the elastic gear 30 and the drive ring 40 is provided at the radially inner side from the circular arc slot 32, the elastic gear 30 is fixed to the drive ring 40 at their portions located between the circular arc slot 32 and the rotor pinion 55. In this case, since it is difficult to transmit the pressing force of the rotor pinion 55 against the elastic gear 30 to the circular arc slot 32, the circular arc slot 32 dose not absorb the pressing force exerted from the rotor pinion 55, whereby the elastic deformation of the elastic gear 30 may be restricted in the radial direction.

Moreover, the drive pins 44a to 44c respectively engage the cam slots 24a to 24c. These engagements permit the drive force of the drive ring 40 to be transmitted to the blades 20a to 20c. In this manner, the drive ring 40 is provided with the structure for transmitting the drive force of the electromagnetic actuator 50 to the blades 20a to 20c. This is because when the elastic gear 30 is provided with the above structure, the drive force may not be transmitted with stability, since the elastic gear 30 is elastically deformable with ease.

Additionally, as mentioned above, the drive pins 44a to 44c have a function for transmitting the drive force of the electromagnetic actuator 50 to the blades 20a to 20c, and also have a function for fixing the elastic gear 30 to the drive ring 40. This reduces the number of the parts, since the fixing function and the transmitting function do not have to be separately provided. Moreover, the number of the parts is reduced, so that the space within the vane driving device can be effectively used, and the assembling workability is improved.

Further, as illustrated in FIGS. 1, 4, and 5, the rotor pinion 55, the teeth portions 43 and 33 serve as a gear mechanism for transmitting the drive force of the electromagnetic actuator 50 to the blades 20a to 20c. This gear mechanism is composed only of the rotor pinion 55 integrated with the rotor 51, and the elastic gear 30 and the drive ring 40 serving as a pair of gears. This reduces the number of the parts, as compared to a structure which transmits the drive force via many gears. This reduces the number of the meshing points of the gears, and also reduces the operation noise for them.

Figure 9:
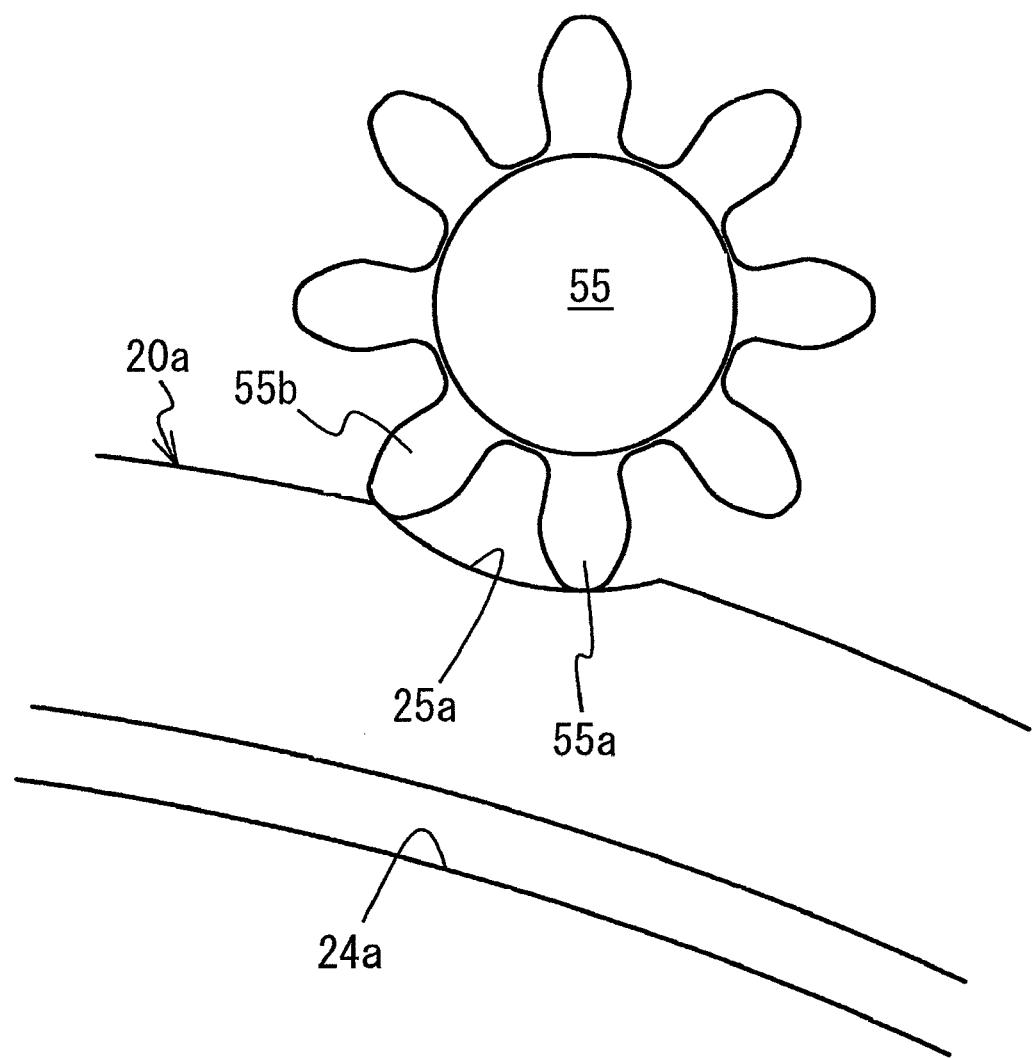
FIG. 9 is an explanatory view of the contact of the blade with the rotor pinion.

Next, a description will be given of the contact of the blade 20a with the rotor pinion 55. FIG. 9 is an explanatory view of the contact of the blade 20a with the rotor pinion 55. FIG. 9 is an enlarged view of the periphery of the rotor pinion 55 illustrated in FIG. 7. Additionally, any other members are omitted in FIG. 9. Referring to FIG. 4, the blade 20a contacts the rotor pinion 55 with the opening area being in the fully opened state. This contact stops the rotation of the rotor pinion 55. Thus, the blade 20a serves as stop means for being into and contact with the rotor pinion 55 and for stopping the rotation of the rotor pinion 55 by contacting the rotor pinion 55. Therefore, the rotations of the elastic gear 30 and the drive ring 40 are stopped, thereby causing the blades 20a to 20c to be located at the receded positions.

Further, the rotor pinion 55 is arranged closer to the electromagnetic actuator 50 than to the drive ring 40 in the transmitting pass on which the drive force is transmitted from the electromagnetic actuator 50 to the blades 20a to 20c. Thus, by directly stopping the rotor pinion 55, the transmission of this drive force can be disconnected before the drive force becomes greater in the process of transmitting the drive force of the electromagnetic actuator 50 to the blades 20a to 20c. Accordingly, this reduces the impact noise caused by the contact, as compared to a conventional case where the shutter plate 60 is provided with a projection shape stopper and the drive ring 40 is stopped by contacting this stopper.

Furthermore, although such stop means may be separately provided from the blade 20a, the number of the parts can be reduced by employing the blade 20a as the stop means.

Also, the blade 20a contacts the rotor pinion 55 in the receded position. This reduces the influence to be applied on the opening area, even when the blade 20a is vibrated by the impact, caused by the contact of the blade 20a with the rotor pinion 55, or the like.

Moreover, as described above, since the rotor pinion 55, the rotary shaft 54, and the rotor 51 are integrated by insert molding, they integrally rotate. That is, the rotor pinion 55 and the rotor 51 integrally rotate. Thus, the rotor pinion 55 is a closest gear to the electromagnetic actuator 50 serving as a drive source. For example, like the conventional vane driving device, in a case where the drive force is transmitted via plural gears including an intermediate gear in order to reduce a rotational speed of the electromagnetic actuator 50, when the intermediate gear is contacted to be stopped, the following problem may occur. In such an intermediate gear, its rotational speed is reduced more than that of a gear closer to the drive source, and its torque is increased. This may increase the operation noise caused by the contact of the intermediate gear. However, as described in the present embodiment, the rotor pinion 55, which is closest to the drive source, is contacted by the blade 20a and is then stopped, thereby stopping the rotation of the rotor pinion 55 with ease, and thereby also reducing the impact noise at that time.

Further, as illustrated in FIG. 9, the blade 20a is provided with a cut-out portion 25a at a position where the blade 20a contacts the rotor pinion 55. The cut-out portion 25a is formed such that the outer edge of the blade 20a has a circular arc to be comparatively small. The curvature radius of the cut-out portion 25a corresponds to the maximum radius from the center of the rotor pinion 55 to the tooth tip. As illustrated in FIG. 9, the length of the cut-out portion 25a and the rotational position of the rotor pinion 55 are designed such that the cut-out portion 25a contacts the two tooth portions 55a and 55b of the rotor pinion 55 when the blade 20a is positioned at the receded position. Since the cut-out portion 25a contacts the two tooth ends of the tooth portions 55a and 55b, the contact area of the blade 20a and the rotor pinion 55 can be increased, thereby assisting in stopping the rotation of the rotor pinion 55. That is, the cut-out portion 25a serves as an engagement structure for contacting the rotor pinion 55 to assist in stopping the rotation thereof.

Furthermore, the contact at two positions alleviates the impact. In addition, each of the blades 20a to 20c has a thin shape to facilitate its elastic deformation. This further alleviates the impact based on the contact of the blade 20a with the rotor pinion 55. Also, referring to FIGS. 7 and 9, the cam slot 24a is arranged close to the cut-out portion 25a. This cam slot 24a facilitates the elastic deformation of the blade 20a in its drive direction. This cam slot 24a is arranged in the vicinity of the contact position so as to absorb the impact caused by the contact. Further, since the cam slot 24a extends along the arc edge of the blade 20a having a fan shape, the cam slot 24a can be enlarged relative to the blade 20a, and the elastic deformation of the blade 20a can be facilitated in its drive direction.

Figure 10A:
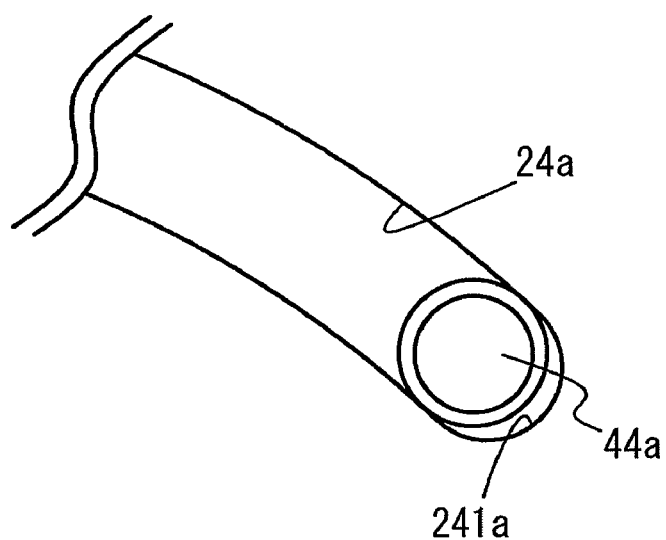
FIGS. 10A and 10B are enlarged views of the periphery of a drive pin positioned at an end portion of a cam slot.
Figure 10B:
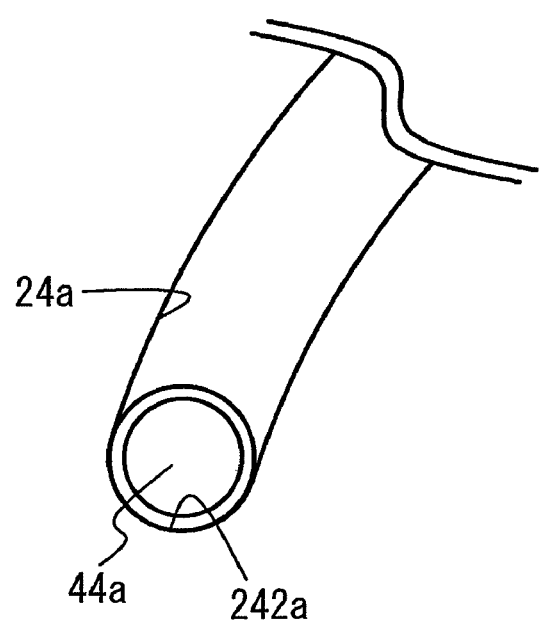

Next, a description will be given of the engagement of the cam slot 24a and the drive pin 44a. FIGS. 10A and 10B are enlarged views of the periphery of the drive pin 44a positioned at an end portion of the cam slot 24a. FIG. 10A illustrates the periphery of the drive pin 44a in the fully opened state. FIG. 10B illustrates the periphery of the drive pin 44a in the small aperture state where the opening area is minimum. The drive pin 44a does not contact one end portion 241a of the cam slot 24a in the fully opened state, as illustrated in FIG. 10A. In contrast, the drive pin 44a contacts the other end portion 242a of the cam slot 24a in the small aperture state, as illustrated in FIG. 10B. These arrangements apply the drive pins 44b and 44c and the cam slots 24b and 24c.

Therefore, in the small aperture state, the drive pins 44a to 44c contact end portions of the cam slots 24a to 24c, respectively, thereby stopping the drive ring 40 and positioning the blades 20a to 20c in such positions to cover the opening. As mentioned above, each of the blades 20a to 20c has a thin shape to facilitate its elastic deformation. Accordingly, this reduces the impact noise, as compared to a conventional case where the shutter plate 60 is provided with a stopper and the drive ring 40 contacts the stopper to stop. Additionally, the shutter plate 60 does not have to be provided with the stopper, thereby simplifying the structure. Moreover, the drive pins 44a to 44c simultaneously contact end portions of the cam slots 24a to 24c, respectively, thereby distributing the impact applied to each member.

Further, in the fully opened state, the blade 20a contacts the rotor pinion 55 to stop the drive of the drive ring 40, as mentioned above. For example, when the blade 20a contacts the rotor pinion 55 to be bent in the optical direction and runs onto a part of the rotor pinion 55, the drive pin 44a contacts the one end portion 241a to stop the drive of the drive ring 40.

In addition, although the drive pin 44a does not contact the one end portion 241a in the fully opened state, as illustrated in FIG. 10A, the drive pin 44a may contact the one end portion 241a. In this case, the drive pin 44a and the blade 20a simultaneously contacts the one end portion 241a and the rotor pinion 55, respectively, thereby further distributing the impact applied to each member and reducing the operation noise.

Figure 11A:
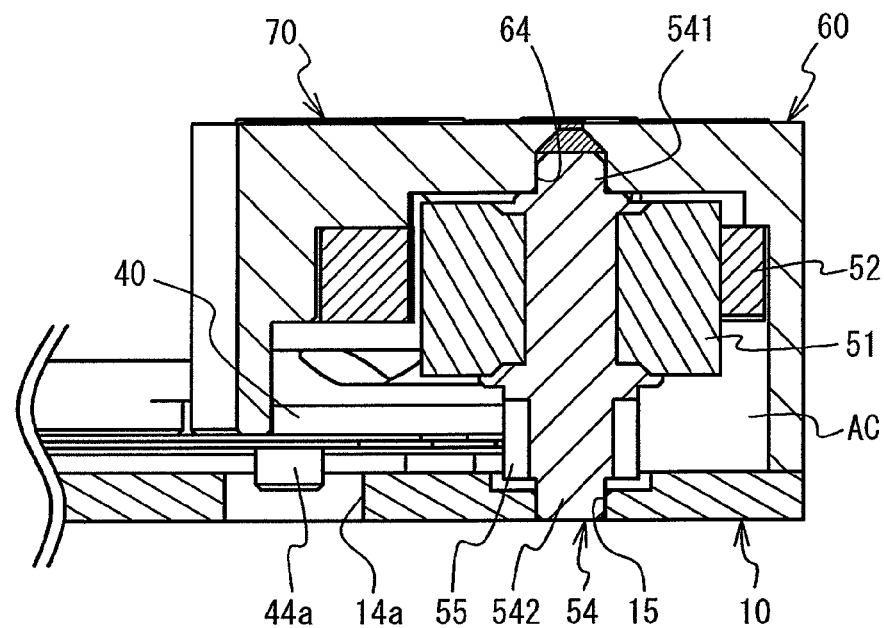
FIGS. 11A and 11B are cross-sectional views of the periphery of the electromagnetic actuator.
Figure 11B:
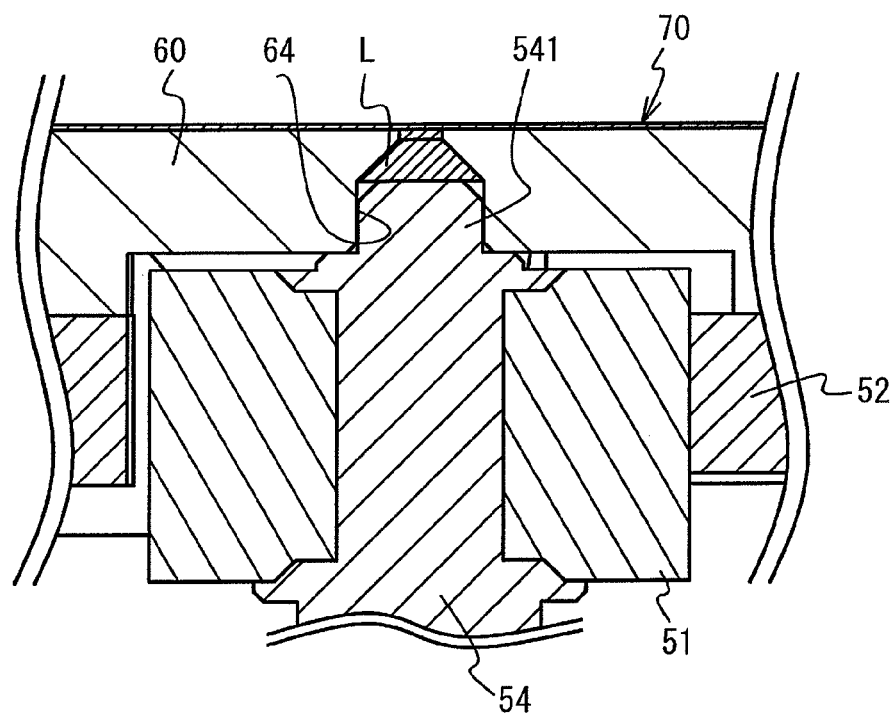

Next, a description will be given of the electromagnetic actuator 50. FIGS. 11A and 11B are cross-sectional views of the periphery of the electromagnetic actuator 50. FIG. 11A is a cross sectional view taken along line A-A in FIG. 6. FIG. 11B is a partially enlarged view of FIG. 11A. Referring to FIG. 11A, the actuator chamber AC, which is defined at two boards between the shutter plate 60 and the blade support plate 10, is formed as a drive source chamber and houses the rotor 51, the stator 52, the rotary shaft 54 and the like. Further, the rotary shaft 54 has one end portion 541 which is located at the image side and which is supported for sliding with respect to the shaft hole 64. The rotary shaft 54 has the other end portion 542 which is located at the object side and which is supported for sliding by the shaft hole 15 formed in the blade support plate 10. Therefore, the rotary shaft 54 is rotatably supported between the blade support plate 10 and the shutter plate 60. Accordingly, the shutter plate 60 serves as a chassis for housing the electromagnetic actuator 50 and supporting the rotary shaft 54 for rotation.

As illustrated in FIG. 11B, the shaft hole 64 is filled with a lubricant L for lubricating the one end portion 541 and the shaft hole 64. Here, the diameter of the shaft hole 64 is made smaller toward the outside from the inside of the shutter plate 60. That is, the shaft hole 64 has a diameter slightly larger than that of the one end portion 541, and is conically shaped such that the diameter is smaller as apart from the one end portion 541. The shaft hole 64 passes through the actuator chamber AC. The FPC 70 is fixed at the outside of the shaft hole 64. The lubricant L is filled in a space defined by the one end portion 541, the shaft hole 64, and the FPC 70. An example of the lubricant L is a grease. In this manner, by filling the lubricant L, the operation noise in accordance with the rotation of the rotary shaft 54 can be reduced by means of a simple structure. Further, such a simple structure also suppresses the manufacturing cost.

Next, a description will be given of the assembling order in which the rotary shaft 54 is assembled into the shaft hole 64. First, the FPC 70 is fixed to the outer wall surface of the shutter plate 60, that is, to an image-side surface opposite to the actuator chamber AC by a double-faced tape. At this time, the shutter plate 60 is fixed to seal the shaft hole 64. Next, the lubricant L is filled in the shaft hole 64 from the actuator chamber AC side to the single shutter plate 60. The shaft hole 64 has a diameter becoming smaller to the outside from the inside of the actuator chamber AC, and is sealed with the FPC 70, as mentioned above. For this reason, when the lubricant with certain high viscosity is filled, the lubricant L may not be leaked out from the shaft hole 64.

Next, the stator 52, around which the coils 53a and 53b are wound, is press fitted into the actuator chamber AC with engaging the boss portions 63. Next, the one end portion 541, which is not provided with the rotor pinion 55, of a part in which the rotor pinion 55, the rotary shaft 54, and the rotor 51 are integrated, is inserted into the shaft hole 64. In this situation, the lubricant L within the shaft hole 64 is pressed outwardly from the actuator chamber AC, whereas the shaft hole 64 is shaped such that its diameter becomes smaller than that of the one end portion 541, as illustrated in FIG. 11B. Moreover, the shaft hole 64 is sealed with the FPC 70. For this reason, the one end portion 541 is merely inserted into a partway of the shaft hole 64, thereby suppressing the lubricant L from being leaked out from the shaft hole 64 by the pressure of the one end portion 541. Further, since the shaft hole 64 passes through the shutter plate 60, even after the one end portion 541 is inserted into the shaft hole 64, air mixed into the lubricant L can be leaked outwardly.

As mentioned above, the FPC 70 is fixed on the shutter plate 60 to seal the shaft hole 64 from its outside. This prevents the lubricant L from being leaked from the shaft hole 64 while the vane driving device operating. Further, the FPC 70 eliminates the necessity of separately providing a member for preventing the leak of the lubricant L, thereby reducing the number of the parts. In this manner, the rotary shaft 54 is assembled into the shaft hole 64.

In addition, since the shaft hole 64 is shaped such that its diameter is made smaller than that of the one end portion 541, the filled space, in which the lubricant L is filled, is prevented from being pressed by the rattling of the rotary shaft 54 in the axial direction, after the assembling of the vane driving device is accomplished. Further, the one end portion 541 of the rotary shaft 54 is located apart from the blades 20a to 20c, and the other end portion 542 is close to the blades 20a to 20c. Since the shaft hole 64 supports the one end portion 541 apart from the blades 20a to 20c, the lubricant L is suppressed from being leaked from the shaft hole 64 into the actuator chamber AC and being attached to the blades 20a to 20c, after the assembling is accomplished. Furthermore, the structure of the vane driving device is simpler in the far side from the blades 20a to 20c than near side thereto, thereby facilitating the work of filling the lubricant L, even in the assembling stage.

Figure 12:
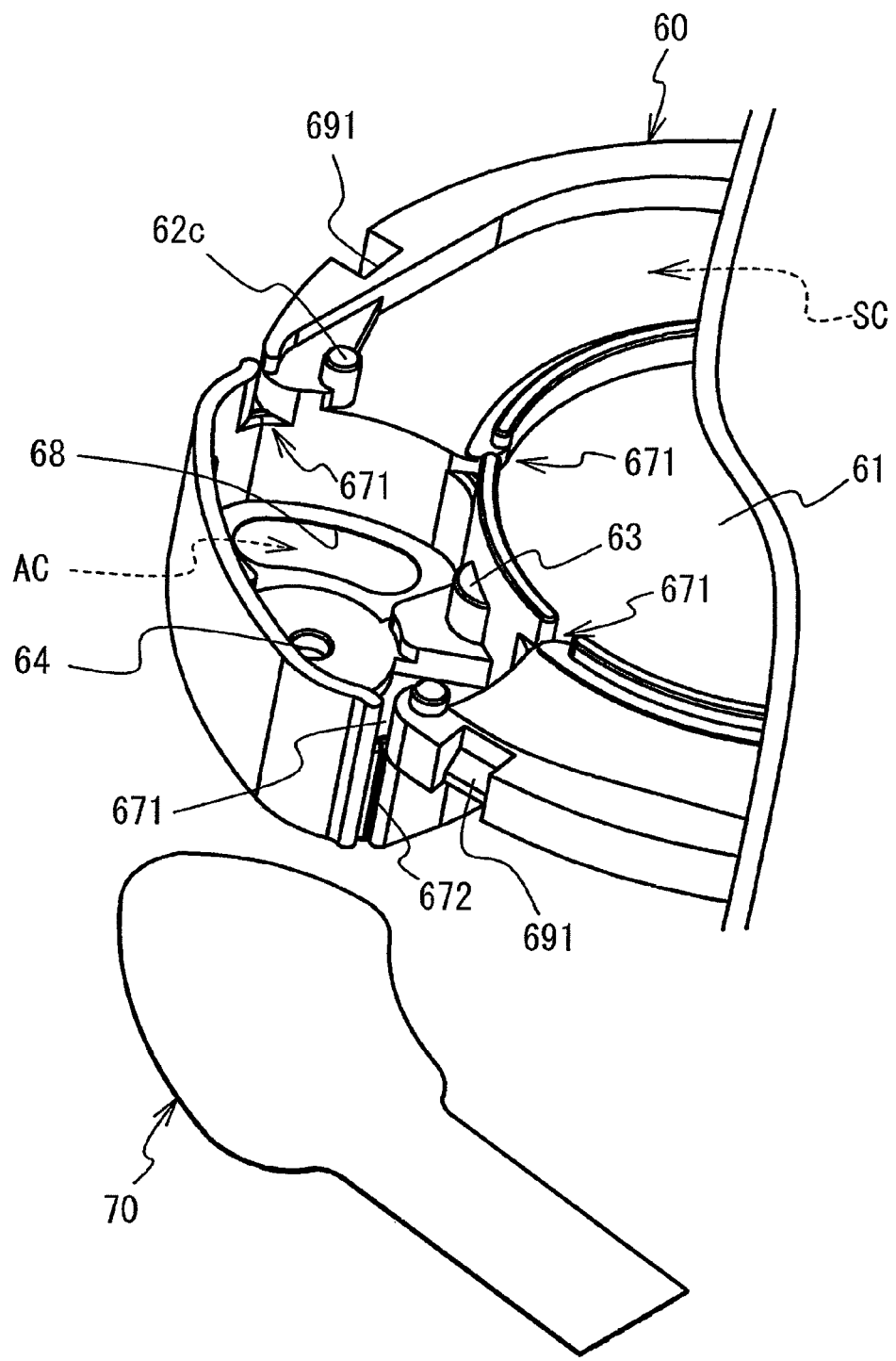
FIG. 12 is an enlarged view of the periphery of an actuator chamber illustrated in FIG. 1.

Next, a description will be given of a structure of the actuator chamber AC. FIG. 12 is an enlarged view of the periphery of the actuator chamber AC illustrated in FIG. 1. Referring to FIG. 12, the actuator chamber AC and the blade chamber SC are continuous with each other. That is, the actuator chamber AC and the blade chamber SC are provided between the blade support plate 10 and the shutter plate 60. In the conventional vane driving device, when the actuator serving as a drive source is formed into a single unit, its thickness in the optical axis direction is increased by the thickness of the shutter plate 60 and that of a cover of the unitized actuator. However, the configuration according to the present embodiment is capable of reducing the thickness in the optical axis direction. Further, as illustrated in FIGS. 11A and 11B, the rotor 51, the rotary shaft 54, and the rotor pinion 55 are integrated into a single unit, and their size is made minimum in the direction of the rotary shaft without the gap between the parts. Therefore, the parts are effectively arranged in the direction of the rotary shaft, thereby suppressing the increase in the thickness in the optical axis direction, and thereby reducing the number of the parts, and suppressing the manufacturing cost. In addition, the actuator chamber AC is provided with reliving holes 68 for relieving the thickness of the coils 53a and 53b in the optical axis direction.

Next, a description will be given of the structure for facilitating the wiring work of the coils 53a and 53b of the electromagnetic actuator 50. The FPC 70 is arranged on the outer surface opposite to the actuator chamber AC. Therefore, the lengths of the coils 53a and 53b extending to the FPC 70 can be shortened, so the coils 53a and 53b can be connected to the FPC 70 with ease. This facilitates the wiring work of the coils 53a and 53b. This also reduces the manufacturing cost.

Further, four escape holes 671 are provided in the vicinity of the actuator chamber AC of the shutter plate 60, as illustrated in FIG. 12. Each of the escape holes 671 has a slit shape. A guide groove 672 extends in the optical axis direction to be continuous with the escape hole 671. Here, the escape hole 671 and the guide groove 672 serve as openings for escaping the wires of the coils 53a and 53b outwardly from the actuator chamber AC serving as a drive source chamber. The guide groove 672 extends to the surface, of the shutter plate 60, on which the FPC 70 is fixed. The four guide grooves 672 correspond to the four escape holes 671. The work for wiring the coil is performed as follow. For example, after the FPC 70 is fixed to the outer wall surface, that is, to the image-side surface opposite to the actuator chamber AC, the electromagnetic actuator 50 is assembled into the actuator chamber AC. Next, one end of the coil 53a extends outwardly from the escape hole 671 located near the one end, respectively. Then, the wire of the coil 53a extends outwardly to the FPC 70 along the guide groove 672, and is connected to the solder land portion thereof. The above mentioned work also applies to the other end of the coils 53a and 53b. In this way, the escape holes 671 serves as escaping the wires of the coils 53a and 53b outwardly from the actuator chamber AC, and the guide grooves 672 serves as guiding the wires of the coils 53a and 53b to the FPC 70. These arrangements facilitate the work for wiring the coils 53a and 53b.

Figure 13A:
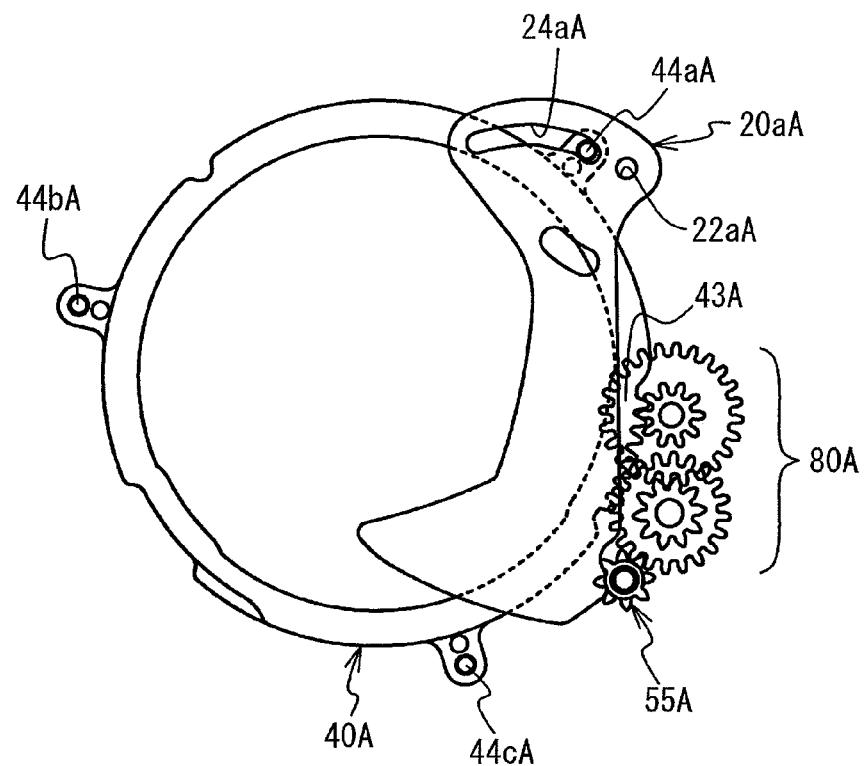
FIGS. 13A and 13B are views partially illustrating the vane driving device according to a first variation.
Figure 13B:
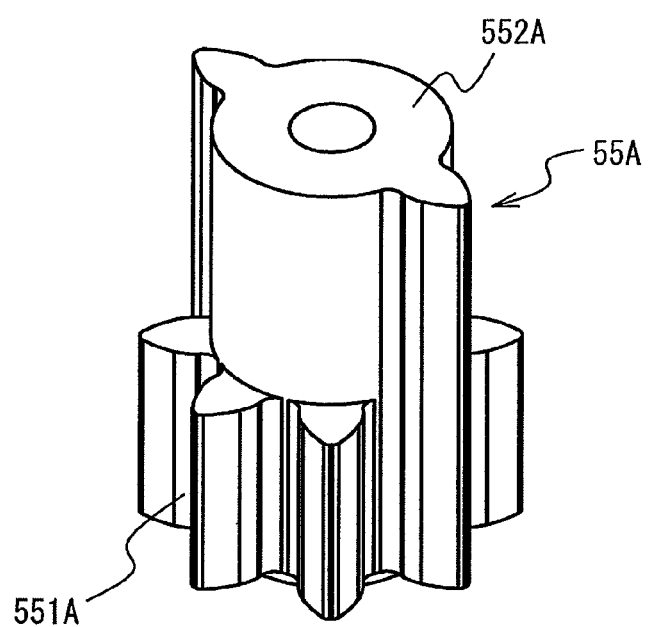

Next, a description will be given of a variation of the vane driving device. FIGS. 13A and 13B are views partially illustrating the vane driving device according to a first variation. Additionally, like the vane driving device mentioned above, the vane driving device according to the variation has three blades. The same components have the same reference numerals in order to avoid a duplicated description. FIG. 13A is a view partially illustrating the vane driving device according to the first variation. FIG. 13A illustrates, a drive ring 40A, a blade 20aA, a rotor pinion 55A, and a gear train 80A. FIG. 13A illustrates a state in which the blade 20aA is positioned at a receded position from an opening.

The rotor pinion 55A is press fitted onto a rotary shaft, not illustrated. By rotating the rotor pinion 55A, its drive force is transmitted to the gear train 80A, thereby meshing the gear train 80A with a teeth portion 43A partially formed in the outer periphery of the drive ring 40A. Therefore, the teeth portion 43A rotates to swing the blade 20aA about a shaft hole 22aA. FIG. 13B is an enlarged perspective view of the rotor pinion 55A. Referring to FIG. 13B, the rotor pinion 55A includes: a lower teeth portion 551A composed of plural tooth portions; and an upper teeth portion 552A composed of two tooth portions and overlapping the lower teeth portion 551A to shape two stages. The rotor pinion 55A is made of a synthetic resin. The lower teeth portion 551A and the upper teeth portion 552A are integrated. The drive force is transmitted to the gear train 80A via the lower teeth portion 551A.

Figure 14:
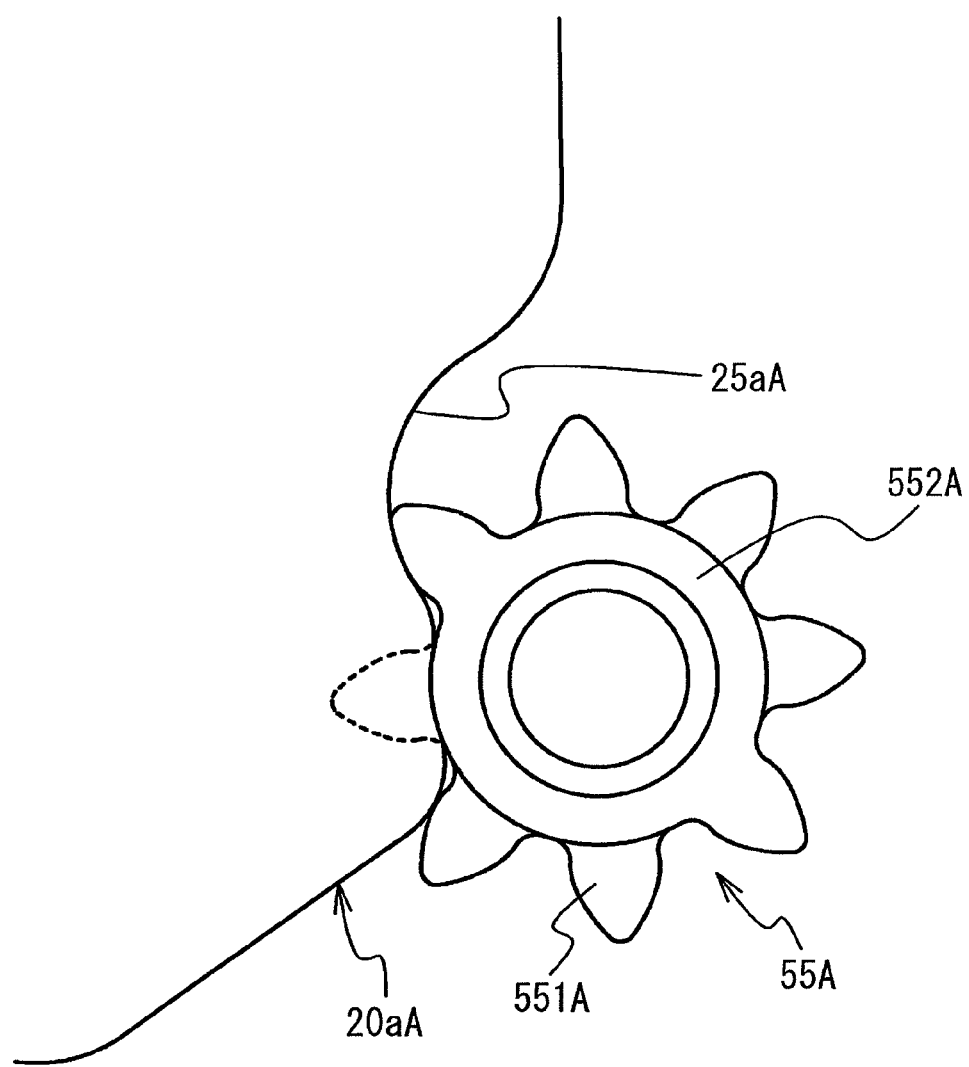
FIG. 14 is an enlarged view of the periphery of a rotor pinion illustrated in FIG. 13A.

FIG. 14 is an enlarged view of the periphery of the rotor pinion 55A illustrated in FIG. 13A. Referring to FIG. 14, a cut-out portion 25aA is provided in the outer periphery of the blade 20aA. When the blade 20aA is positioned at the receded position, the cut-out portion 25aA contacts the upper teeth portion 552A. Further, the lower teeth portion 551A is positioned at the rear side of the blade 20aA. The upper teeth portion 552A is formed to serve as a projection portion projecting outwardly and radially. Thus, when the upper teeth portion 552A contacts the cut-out portion 25aA, the upper teeth portion 552A engages the cut-out portion 25aA, thereby stopping the rotation of the rotor pinion 55A. That is, the upper teeth portion 552A serves as an engagement structure to aid in stopping the rotation of the rotor pinion 55A with the blade 20aA contacted with the rotor pinion 55A. With such a configuration, the rotation of the rotor pinion 55A is also stopped by a simple structure.

Figure 15A:
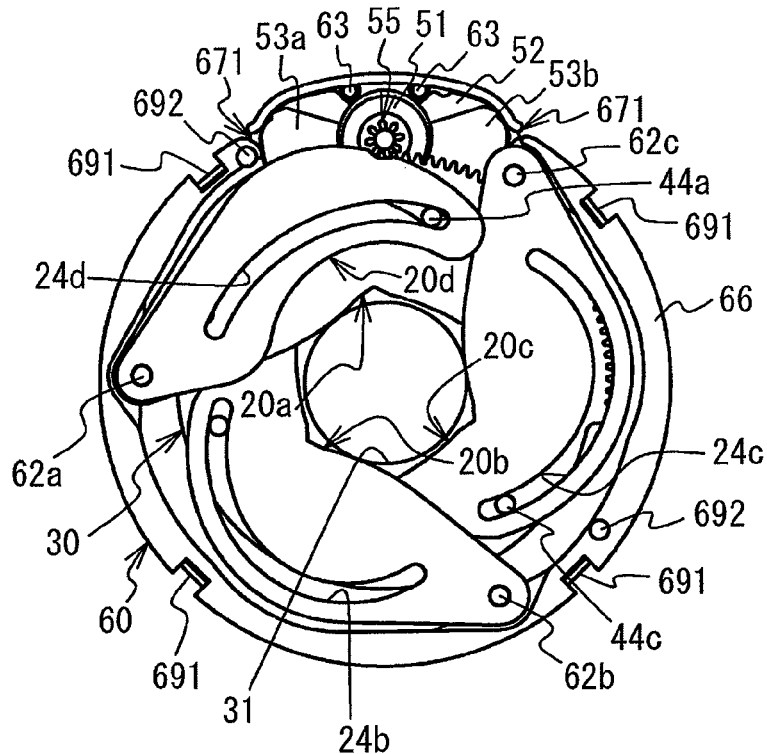
FIGS. 15A and 15B are views partially illustrating a vane driving device according to a second variation.
Figure 15B:
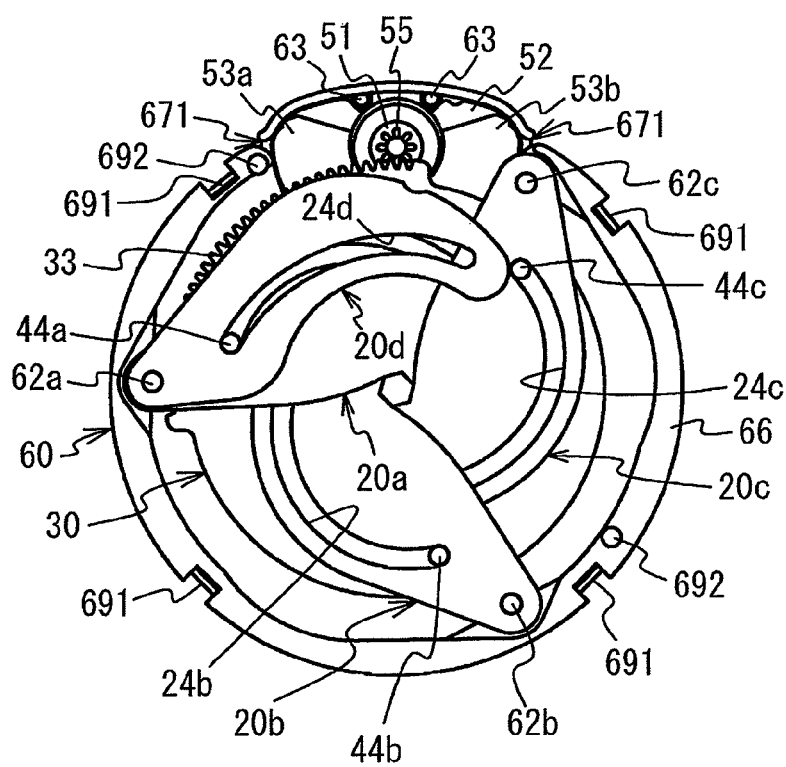

FIGS. 15A and 15B are views partially illustrating a vane driving device according to a second variation. FIG. 15A is a front view of the vane driving device in a fully opened state according to the second variation. FIG. 15B is a front view of the vane driving device in a fully closed view according to the second variation. Referring to FIGS. 15A and 15B, the vane driving device according to the second variation includes a blade 20d in addition to the blades 20a to 20c. The blade 20d is swingably supported by the support shaft 62a, like the blade 20a. The blade 20d is arranged at the object side with respect to the blade 20a. Further, the blade 20d is provided with a cam slot 24d having a circular arc shape. The cam slot 24d engages the drive pin 44a. In the state illustrated in FIG. 15A, that is, in the state where the opening is fully opened, the blade 20d contacts the rotor pinion 55 to stop the rotation thereof. Thus, the blade 20d serves as stop means for contacting the rotor pinion 55 and for stopping the rotation of the rotor pinion 55.

While the preferred embodiments of the present invention have been illustrated in detail, the present invention is not limited to the above-mentioned embodiments, and other embodiments, variations and modifications may be made without departing from the scope of the present invention.

In the above embodiments, the blade support plate 10 is arranged at the object side. However, the vane driving device may be configured such that the shutter plate 60 is arranged at the object side and the blade support plate 10 is arranged at the image side.

An intermediate gear may be provided between the rotor pinion 55 and the teeth portions 33 and 43 to contact the blade 20a and stop the drive of the drive ring 40.

Although the elastic gear 30 and the drive ring 40 serve as a pair of gears, the present invention is not limited to these arrangements. For example, an intermediate gear may be employed as such a pair of gears.

In a case where an intermediate gear is employed as a pair of gears mentioned above, the other tooth surface, of the second tooth portion of the second gear not provided with a deformation facilitating portion, may transmit the drive force to a mating gear meshing the intermediate gear.

In the above embodiment, the elastic gear 30 is formed of a synthetic resin. However, a sheet member made of polyethylene terephthalate or acrylate resin, a generally antireflective film, a light shielding film such as a somablack film (SOMAR corporation) may be formed by pressing.

In the above embodiment, each of the blades 20a to 20c is made thin to be elastically deformable with ease. However, a manufacturing method of the blades is not limited to, and the blades may be formed by either molding or pressing.

In the above embodiment, the rotor pinion 55, the rotary shaft 54, the rotor 51 are integrated by inserting. However, all the rotor pinion 55 and the rotary shaft 54 may be integrated.

In the embodiment, a printed substrate employs the flexible printed circuit board 70. However, the printed substrate may employ a rigid substrate made of a material with rigidity, such as an epoxy resin In the embodiment, although the escape holes 671 and the guide grooves 672 are formed in the shutter plate 60, these configurations may be formed in the blade support plate 10.

Finally, several aspects of the present invention are summarized as follows.

According to an aspect of the present invention, there is provided a vane driving device including: two boards each having an opening and defining a blade chamber therebetween; a blade changing an area of the opening and housed in the blade chamber; a drive source for driving the blade, the drive source including: a coil wound around a stator and exciting a stator; a rotor rotatably supported by a rotary shaft, rotatable in conjunction with the rotary shaft, and magnetized to have different polarities in a circumferential direction; and a rotor pinion meshing a driven member, and integrally formed in the rotary shaft; and a printed substrate electrically connected to the coil, wherein: the two boards define a drive source chamber housing the drive source therebetween; at least one of the two boards has an opening for escaping the coil outwardly from the drive source chamber; and the printed substrate is arranged on a outer wall surface opposite to the drive source chamber.

With such a configuration, two boards define the blade chamber and the drive source chamber, and the rotary shaft and the rotor pinion are integrated, thereby reducing the thickness in the optical axis direction. Further, at least one of two boards is provided with the opening for escaping the coil outwardly from the drive source chamber, and the printed substrate is arranged on the outer wall surface of the drive source chamber. This shortens a distance which is required for extending the wire of the coil to the printed substrate, and easily connects the wire of the coil to the printed substrate. Accordingly, wiring of the coil can be facilitated, and the manufacturing cost can be reduced.

In the above configuration, the rotor, the rotary shaft, and the rotor pinion may be integrally formed.

This arrangement reduces the thickness in the optical axis direction and the number of the parts, and also suppresses the manufacturing cost.

What is claimed is:

1. A vane driving device comprising:
   two boards each having an opening and defining a blade chamber therebetween;
   a blade changing an area of the opening and housed in the blade chamber;
   a drive source for driving the blade, the drive source including:
      a coil wound around a stator and exciting a stator;
      a rotor rotatably supported by a rotary shaft, rotatable in conjunction with the rotary shaft, and magnetized to have different polarities in a circumferential direction; and
      a rotor pinion meshing a driven member, and integrally formed in the rotary shaft; and
   a printed substrate electrically connected to the coil, wherein:
   the two boards define a drive source chamber housing the drive source therebetween,
   at least one of the two boards has an opening for escaping the coil outwardly from the drive source chamber,
   the printed substrate is arranged on a outer wall surface opposite to the drive source chamber,
   the drive source chamber includes a shaft hole supporting the rotary shaft for rotation,
   the shaft hole passes through the drive source chamber, and defines a filled space in which the lubricant for lubricating between the shaft hole and the rotary shaft is filled, and
   the printed substrate covers the shaft hole from an outside of the drive source chamber.

2. The vane driving device of claim 1, wherein the rotor, the rotary shaft, and the rotor pinion are integrally formed.

* * * * *